F. C. NICKOL.
MACHINE FOR FORMING ARMATURE COILS.
APPLICATION FILED MAR. 1, 1920.

1,373,522.

Patented Apr. 5, 1921.
5 SHEETS—SHEET 1.

INVENTOR
F.C. NICKOL
BY Edward Reed
ATTORNEY

F. C. NICKOL.
MACHINE FOR FORMING ARMATURE COILS.
APPLICATION FILED MAR. 1, 1920.

1,373,522.

Patented Apr. 5, 1921.
5 SHEETS—SHEET 3.

INVENTOR.
F. C. NICKOL
BY Edward Reed
ATTORNEY

INVENTOR.
F. C. NICKOL.
BY Edward Reed
ATTORNEY

F. C. NICKOL.
MACHINE FOR FORMING ARMATURE COILS.
APPLICATION FILED MAR. 1, 1920.

1,373,522.

Patented Apr. 5, 1921.
5 SHEETS—SHEET 5.

INVENTOR.
F. C. NICKOL.
BY
ATTORNEY.

UNITED STATES PATENT OFFICE.

FREDERICK C. NICKOL, OF DAYTON, OHIO, ASSIGNOR TO CITY MACHINE & TOOL WORKS, OF DAYTON, OHIO, A COPARTNERSHIP CONSISTING OF FREDERICK C. NICKOL AND OSCAR M. POOCK.

MACHINE FOR FORMING ARMATURE-COILS.

1,373,522.   Specification of Letters Patent.   Patented Apr. 5, 1921.

Application filed March 1, 1920. Serial No. 362,578.

*To all whom it may concern:*

Be it known that I, FREDERICK C. NICKOL, a citizen of the United States, residing at Dayton, in the county of Montgomery and State of Ohio, have invented certain new and useful Improvements in Machines for Forming Armature-Coils, of which the following is a specification, reference being had therein to the accompanying drawing.

This invention relates to machines for forming armature coils and the like and is in the nature of an improvement upon the machine shown and described in the application for patent filed by Frederick C. Nickol and Clarence H. Knowles, December 17, 1917, Serial No. 207,436.

The object of the invention is to provide a machine of this kind which will be simple in its construction and operation; and which will operate at a high speed.

Other objects of the invention will appear as the machine is described in detail.

Figure 1:
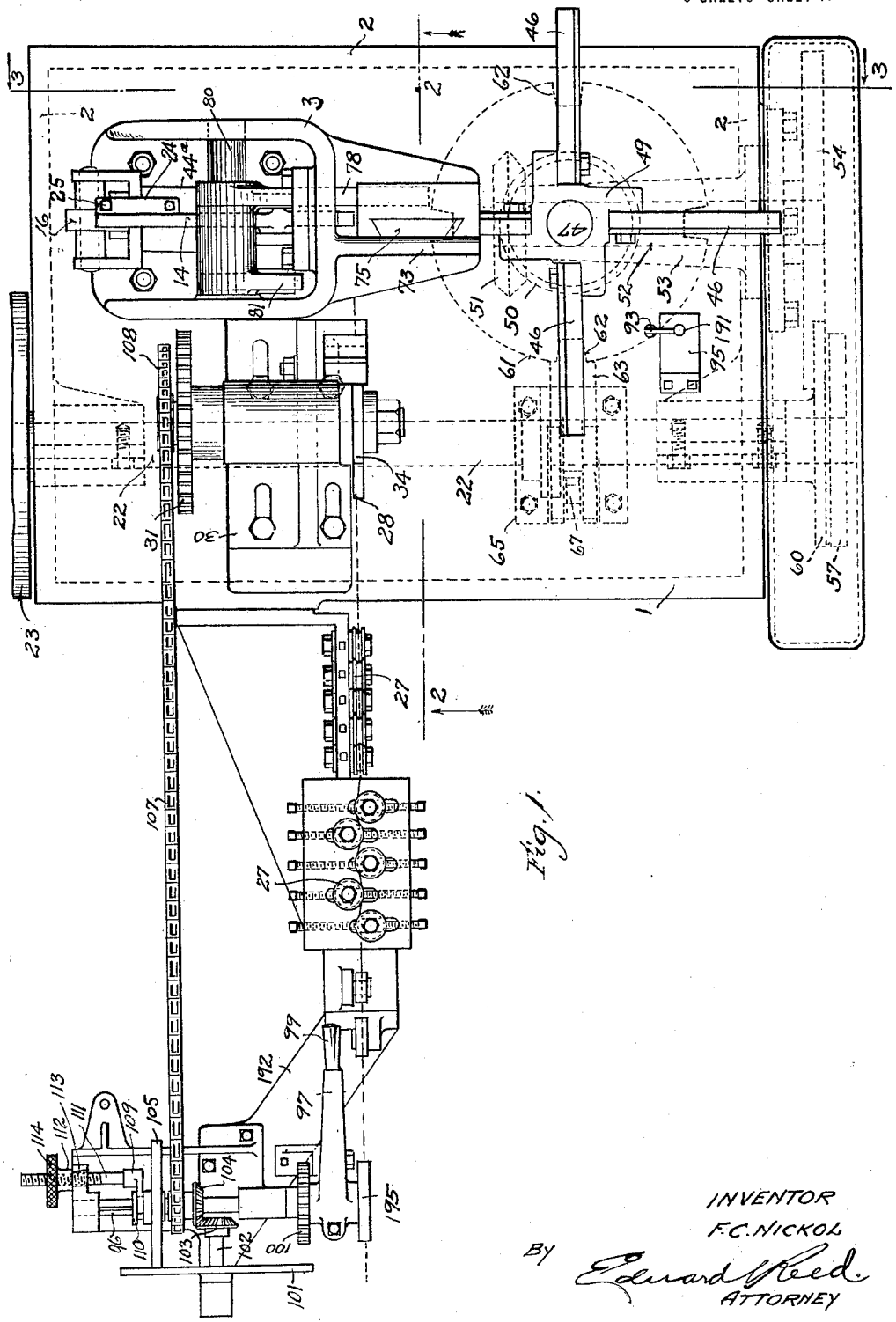
Figure 2:
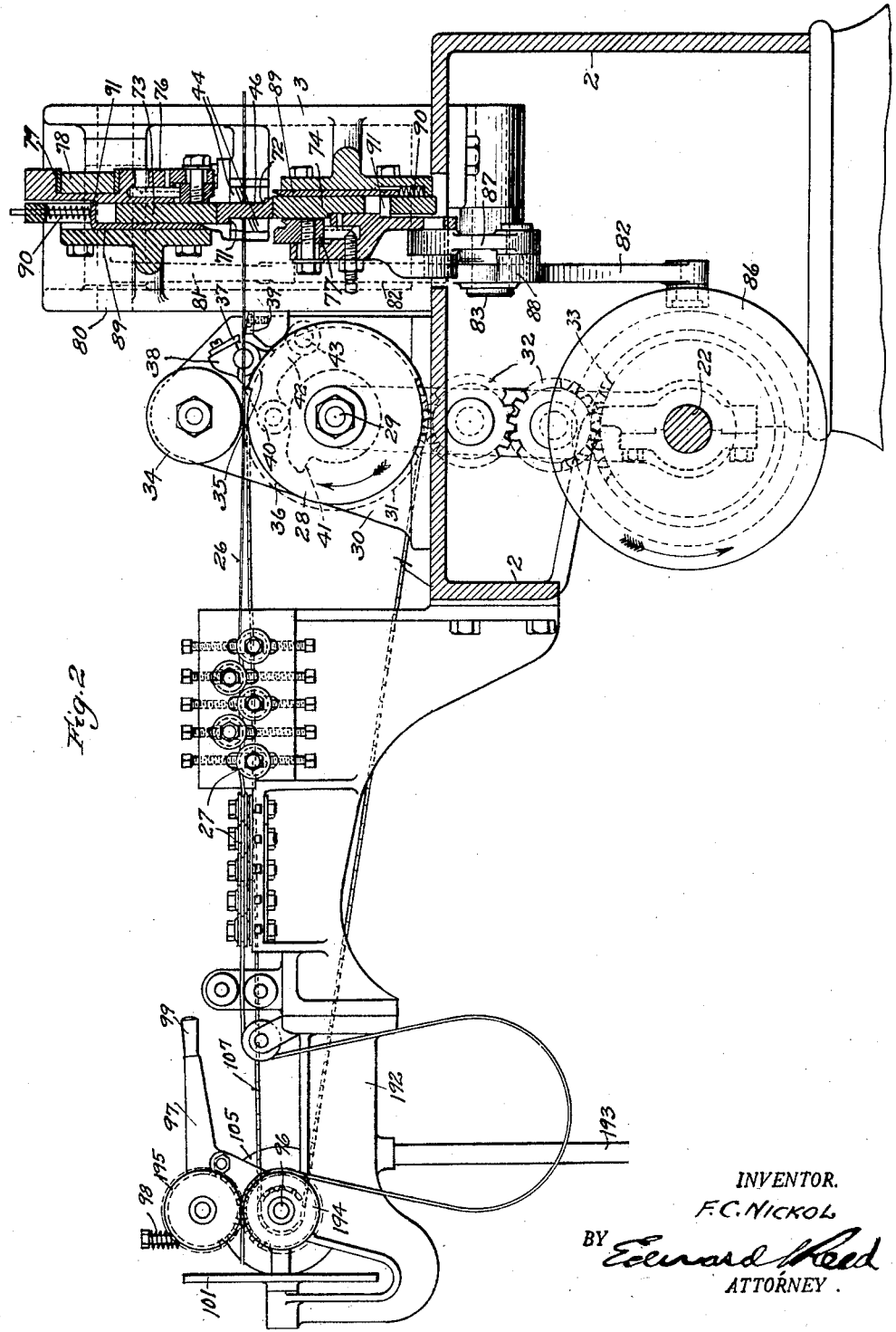
Figure 3:
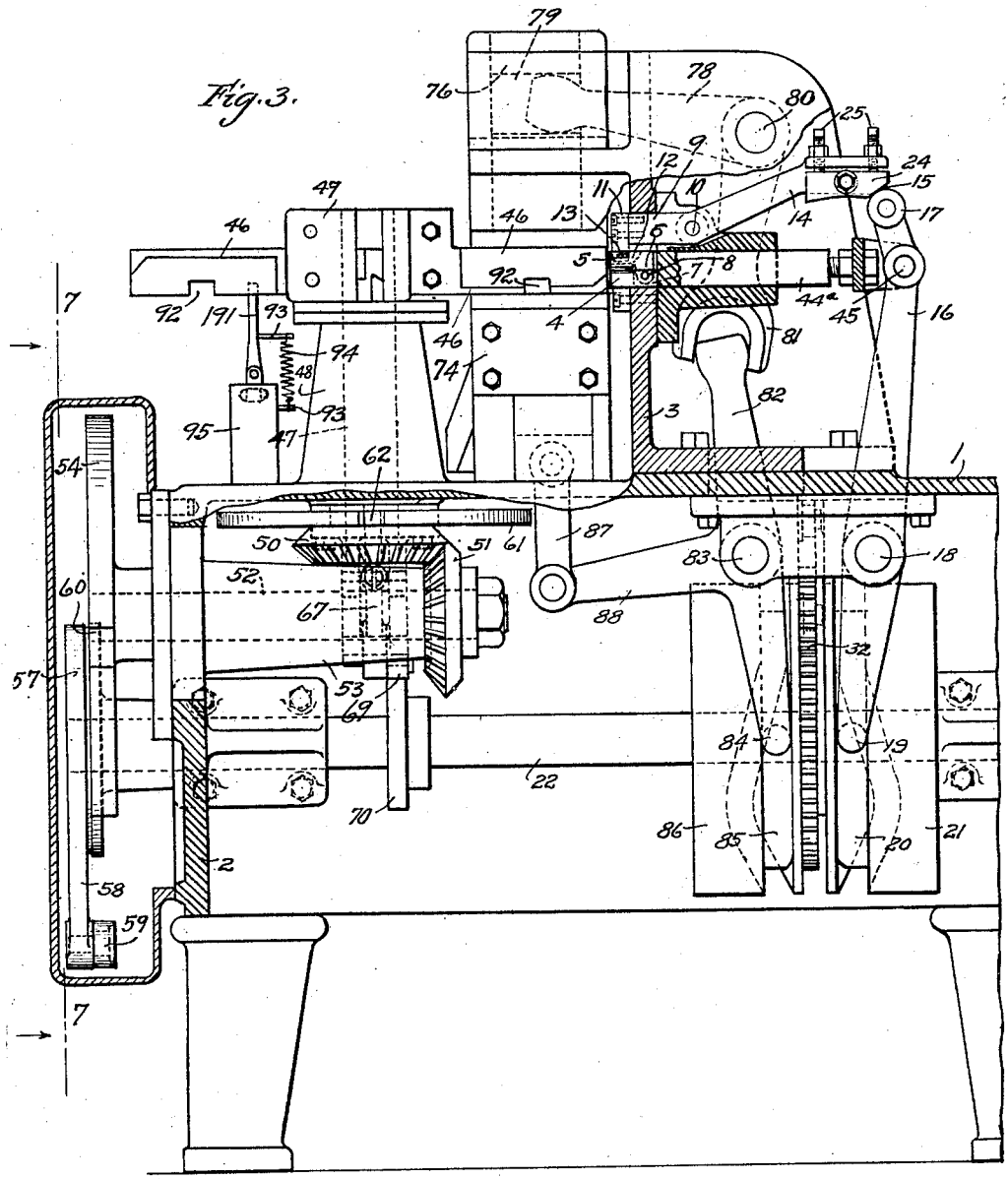
Figure 4:
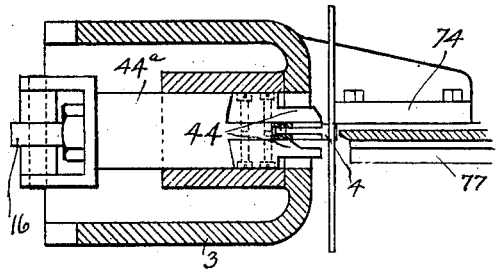
Figure 5:
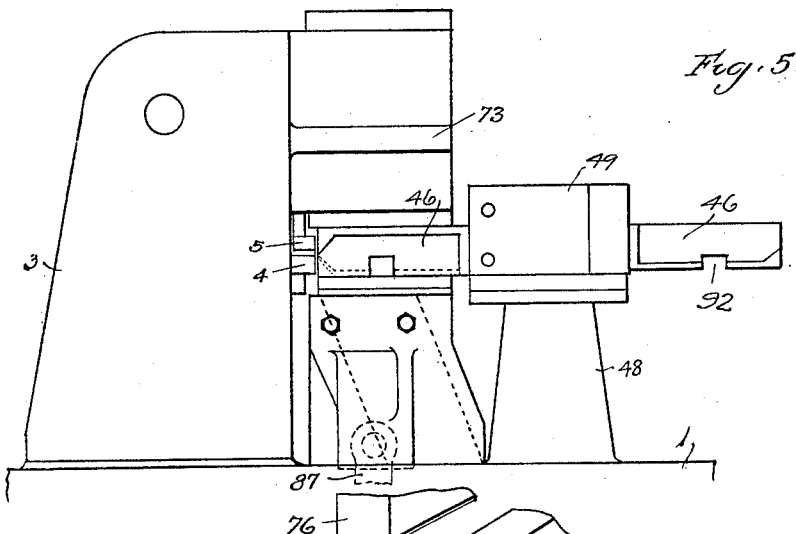
Figure 6:
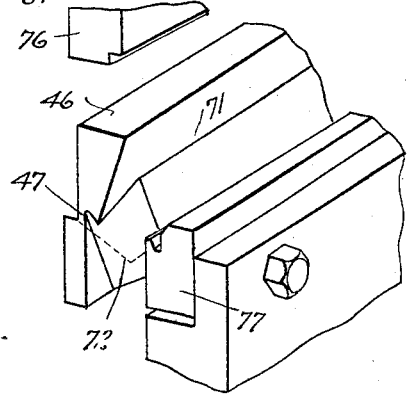
Figure 7:
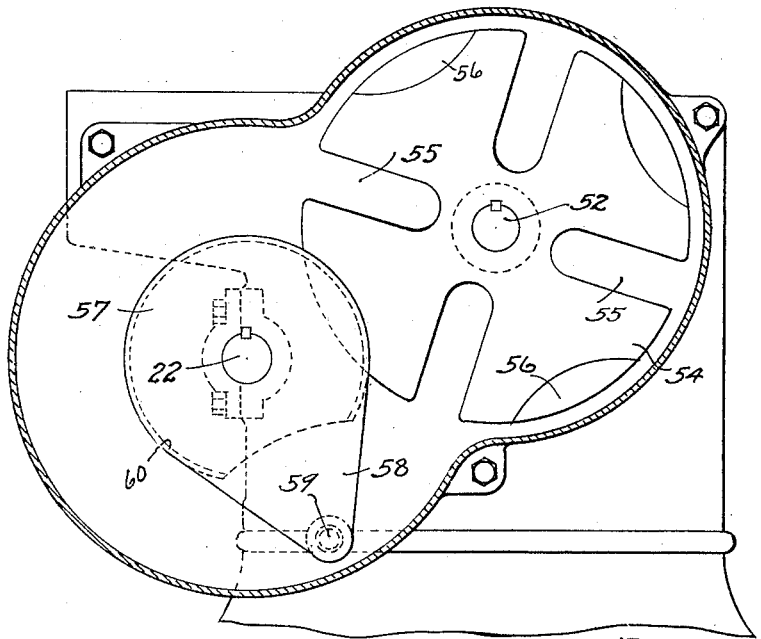
Figure 8:
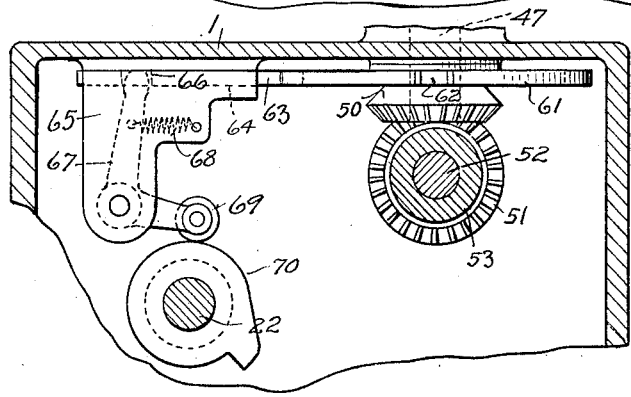
Figure 9:
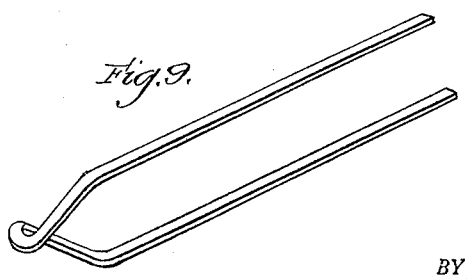

In the accompanying drawings Figure 1 is a plan view of a mechanism embodying my invention; Fig. 2 is a transverse sectional view taken on the line 2—2 of Fig. 1 looking in the direction of the arrows; Fig. 3 is a section taken on the line 3—3 of Fig. 1 looking in the direction of the arrows; Fig. 4 is a horizontal section taken through the forming mechanism, between the gripping jaws; Fig. 5 is a side elevation of the forming mechanism, Fig. 6 is a detail view of portions of the die plate and one of the movable forming dies; Fig. 7 is a section taken on the line 7—7 of Fig. 3 showing the driving mechanism for the die turret; Fig. 8 is a detail view of the locking device for the die turret; and Fig. 9 is a detail view of the finished coil.

In carrying out my invention I provide feeding mechanism which will advance predetermined lengths of a wire, or bar of material, from which the coil or other article is to be formed, to gripping devices which engage the bar and hold the same during the cutting, bending and forming operations. The cutting devices sever the length or section of the bar which has been advanced and bending devices act upon the bar while it is held by the gripping devices to bend the end portions thereof toward each other about a bending die, thereby giving the bar substantially a U-shape. After the end portions of the bar have been bent they are acted upon by forming devices to impart thereto the desired configurations. The forming devices comprise relatively fixed die faces carried by a die plate, which also constitutes a bending die, these die faces being arranged on opposite sides of the plate and facing upwardly and downwardly respectively. Movable forming dies engage the end portions of the bar on the opposite sides of the plate and coöperate with the fixed die faces of the die plate to bend the bar into the desired shape. The die plate is movable into and out of its operative position and I prefer to provide a plurality of die plates which are movable toward and away from the gripping device and the bending devices, thereby enabling one die plate to be moved into operative position as the preceeding die plate is moved out of operative position to permit the completed article to be removed therefrom. It will be understood that the invention may be embodied in mechanisms of various kinds and that the particular mechanism here illustrated has been chosen for the purpose of illustration only.

In that embodiment of the invention here illustrated I have shown the mechanism as mounted upon a main supporting frame consisting of a top plate 1 and depending flanges, or side members, 2. Carried by this main frame and preferably mounted on a supplemental frame 3 which is rigidly secured to the main frame is a gripping device which preferably comprises a fixed lower jaw 4 and a movable upper jaw 5. The movable jaw 5 is preferably pivoted at its inner end to permit its outer, or free, end to move toward and from the fixed jaw. In order that the outer end of the pivoted jaw may not project substantially beyond the end of the fixed jaw when the jaws are open I have mounted the fixed jaw for movement about a relatively short radius and, as here shown, the movable jaw 5 is provided with a lug 6 which extends into a recess 7 in the inner end of the fixed jaw and is secured therein by the pivot pin 8. An operating arm 9 is connected with the movable jaw for moving the same about its axis and for causing the same to grasp the bar when the latter has been moved between the jaws. As here shown this arm is pivotally mounted on the supplemental frame 3, as shown at 10, and has at its forward end a depending lug 11 which enters a recess 12 in the outer end of the movable jaw and is secured therein by a pivot pin 13, the lug 11 having a horizontal slot to receive the pin and thus permit the arm and the movable jaw to move about their respective axes. Rigidly connected with the operating arm 9 and preferably formed integral therewith is a second arm 14 having at its outer end a cam surface 15 which is arranged in the path of the upper end of an operating lever 16, which is preferably provided with a roller 17 to engage the cam surface of the arm 14. The operating lever is pivotally mounted at 18 on a suitable support arranged beneath the top plate 1 and has at its lower end a projection, or roller, 19, which extends into a circumferential groove 20 formed in the periphery of a cam disk 21 which is rigidly secured to a main operating shaft 22, which is journaled in the flanges 2 at the opposite ends of the main frame. Power may be applied to this shaft 22 in any suitable manner, as by means of a belt pulley 23. The cam surface 15 on the operating arm 14 is so shaped that the initial contact of the operating lever with the said cam surface will rock the arm 14 about its axis and move the jaw 5 into gripping position, and the further movement of the operating lever will retain the jaw in that position. In the present instance the cam surface is formed on a block 24 which is pivotally connected between its ends to the arm 14 and may be adjusted by means of set screws 25 to regulate the relation of the cam surface to the end of the operating lever. The cam groove 20 is so shaped that the movable jaw will be moved into gripping position as soon as the bar has been fed into its proper position between the two jaws of the gripping device and will be held in that position until the cutting, bending and forming operations have been completed.

The bar of material, which is shown at 26 in Fig. 2, may be fed to the gripping device in any suitable manner and from any suitable source of supply. Preferably it is taken from a coil or spool, and advanced intermittently by a feeding device arranged adjacent to the bending and forming mechanism. As here shown the feeding device comprises two coöperating disks which draw the wire from the coil, or spool, through suitable straightening devices 27 and advance the same to and between the jaws of the gripping device. The lower feeding disk 28 is mounted on a shaft 29 mounted in a suitable bracket 30 carried by the top plate 1 of the main frame and is positively driven by a gear 31 rigidly secured to said shaft and connected by means of intermediate gears 32 with a gear 33 on the main shaft 22. The second gear 34 of the feeding device is a pressure disk and is not positively driven. The lower disk has a portion of its surface, as shown at 35, of such a radius that the bar 26 will be grasped between the two disks and feeding movement imparted thereto when the portion 35 of the disk is adjacent to the upper disk 34, and has another portion of its surface, 36, of a shorter radius so that the disk will not operatively engage the bar when this last mentioned portion thereof is adjacent to the disk 34. Consequently upon each complete rotation of the main disk 28 the bar will be advanced a distance equal to the circumferential length of the portion 35 of the disk and this length is equal to the length of the bar from which each article is formed. The feeding disk being driven constantly from the main shaft will thus intermittently advance the bar and will allow the latter to remain stationary during the cutting, bending and forming operations to be hereinafter described.

When the bar has been fully advanced and has been engaged by the gripping device the portion which has been so advanced is severed from the stock. Any suitable cutting device may be provided for this purpose. As here shown, a cutter 37 carried by an arm, or cutter head, 38 pivotally mounted on the bracket 30, coöperates with a fixed cutter block 39 arranged at a distance from the gripping jaws equal to the length of one side portion of the bar. The arm 38 projects beyond the axis of the cutter and is provided with a projection, or roller, 40 arranged to be engaged by a cam 41 rigidly secured to the shaft 29 and so arranged with relation to the feeding disk 28 that it will operate to sever the bar after the completion of the feeding operation. The cutter is held normally in its raised, or inoperative, position by gravity, the weight of the lower portion of the arm being greater than that of the upper portion thereof, but I prefer to provide means for positively returning the cutter to its inoperative position and thereby avoiding any possibility of it sticking or being otherwise retained in the path of the bar during the next feeding operation. To thus positively restore the cutter to its inoperative position I have provided the lower portion of the arm 38 with a forwardly projecting extension 42 which also has a projection, or roller, 43 arranged in the path of the projection of the cam 41 so that immediately following the cutting operation the cam will act upon the extension 42 to move the cutter in the opposite direction, it being noted that the projections on the two arms lie on opposite sides of a line extending through the axes of the shaft 29 and the cutter 37.

After the bar has been engaged by the gripping devices and severed from the stock it is acted upon by suitable bending devices to bend the two end portions thereof one toward the other. In the present construction of the mechanism these bending devices comprise two reciprocatory plungers or fingers 44 which are slidably mounted in suitable bearings in the supplemental frame 3 on opposite sides of the gripping device and have their operative ends arranged in the plane of the bar which is gripped by said device. These bending fingers or plungers 44 are held normally in their retracted positions and are projected, immediately following the severing of the bar by means of the operating lever 16 which is pivotally connected with the rear ends of said plungers, as shown at 45. Coöperating with the bearing fingers, or plungers, 44 is a die plate 46 having at its end a die about which the bar is bent. In the present instance this die is an integral part of the plate, as shown at 47, in Fig. 6. The die plate is movable into and out of its operative position with relation to the gripping and bending devices to permit the finished article to be removed therefrom and a new bar to be fed into position. Preferably a plurality of die plates are provided and are moved successively into and out of their operative positions, and by moving the die plates transversely to their length into and out of such operative positions one die may be moved into its operative position simultaneously with the withdrawal of the preceding die plate. While this movement may be accomplished in various ways I have here shown the several die plates, of which in the present instance I have provided four, as mounted for rotation about a common axis and thus constituting what may be termed a die turret. The several die plates extend radially from a vertical shaft 47, which is journaled in a bearing 48 on the top plate 1 of the main frame and are rigidly secured to a head 49 carried by said shaft and held against rotation relatively thereto. This turret is rotated intermittently to bring each of the several die plates successively into operative relation to the gripping and bending devices, and inasmuch as one complete cycle of operations of the gripping, feeding, bending and forming devices is accomplished for each full rotation of the driving shaft 22, it will be apparent that the turret must be driven through a quarter revolution only for each full rotation of the driving shaft. Rotation is, in the present instance, imparted to the turret by means of a beveled gear 50 which is rigidly secured to the shaft 47 below the top plate 1 and which meshes with a second beveled gear 51 secured to a shaft 52 journaled in a horizontal bearing 53 carried by the adjacent side wall, or flange 2, of the main frame. This shaft 52 projects beyond the end of the main frame and has rigidly secured thereto a feeding disk 54 which forms one member of a Geneva actuating mechanism. The disk 54 is provided with four radial slots 55 spaced equal distances about the same and those portions of the disk lying between the slots have their peripheries cut away to provide curved recesses 56. Rigidly mounted on the end of the main shaft 22 is a second disk 57 of such a radius that its periphery normally extends into one of the recesses 56 of the disk 54 and thus holds that disk against rotation. The disk 57 has a radially projecting arm 58 provided at its outer end with a laterally extending pin 59 which is so arranged that it will be moved by the rotation of the disk 57 into one of the slots 55 in the disk 54. The disk 57 comprises a laterally extending flange 60 which is the part that extends into the recess 56 of the disk 54. Adjacent to the arm 58 the flange 60 is cut away so that when the pin 59 enters the slot 55 and engages the edge thereof the disk 54 will be free to rotate and will be rotated by the pin 59 through a quarter of a revolution. At the completion of a quarter of a revolution the pin 59 will clear the slot 55 and the flange 60 will enter the succeeding recess 56 of the disk 54, thus again locking the disk 54 and its shaft 52 against rotation.

The die turret is centered and positively locked in its operative position by a suitable indexing device which, as here shown, comprises a disk 61 rigidly secured to the turret shaft 47 below the top plate 1 of the main frame and provided in its periphery with four radial notches 62 which taper inwardly. Coöperating with the disk 61 is a locking bar 63 having a tapered end adapted to enter any one of the recesses 62. This bar is slidably mounted in a guideway 64 formed between a bracket 65 and the lower surface of the top plate 1 of the main frame and has formed therein an opening 66 to receive the upper end of a bell crank lever 67, which lever is acted upon by a spring 68 to move the locking bar 63 toward the disk 61 and to hold the same normally in engagement therewith. The second arm of the bell crank lever, which is preferably provided with a roller 69, is acted upon by a cam 70 which is rigidly secured to the main shaft 22 and which serves upon each rotation of the shaft 22 to rock the bell crank lever about its axis and thus withdraw the locking bar from the recess in which it is seated. The action of the cam is so timed that while the locking bar is in its inoperative position the driving mechanism will impart movement to the turret shaft and the disk 61, thus moving the notch out of alinement with the locking bar, consequently when the cam 70 again releases the bell crank lever, the spring 68 will hold the locking bar in engagement with the periphery of the disk 61 until the turret shaft has completed its rotation and another recess has been brought into alinement with the locking bar. The action of the spring will then cause the bar to enter this other recess and because of the tapered walls thereof the bar will accurately position the turret with the die plate in a correct relation to its coöperating parts and will hold the same rigidly in that position.

After the bar has been bent along the sides of the die plate 46 it is acted upon by suitable forming devices to bend it into the desired shape, which in the present instance is that shown in Fig. 9, and consists in bending the end portions upwardly and downwardly, respectively, relatively to the part which is held to the gripping device and imparting a slight longitudinal twist to the parallel portions thereof. The forming devices which impart this shape to the finished article are carried in part by the die plate 46 and in part by the supplemental frame 3. Each die plate 46 is provided on its front and rear faces with downwardly and upwardly facing die surfaces, as shown at 71 and 72. The movable forming members, or dies, are carried by two brackets, or guide plates, 73 and 74, which project forwardly from the supplemental frame 3 above and below the gripping jaws and are spaced apart a distance just sufficient to permit the die plates to pass between them, as shown in Figs. 2 and 5. Slidably mounted upon the bracket 73, and preferably secured thereto by means of a dovetailed connection 75, is a movable die member 76 having at its lower edge a die surface to coöperate with the die surface 72 on the die plate. Slidably mounted upon and similarly connected with the lower bracket 74 is a second die member 77 having at its upper edge a die surface to coöperate with the die surface 71 on the die plate 46. Vertical movement is imparted to the upper movable die member 76 by means of a crank arm 78, the rounded end of which extends into a recess 79 in the die block and which is rigidly secured to a shaft 80 journaled in the supplemental frame 3. Rigidly secured to the shaft 80 and extending downwardly therefrom is an arm 81, the lower end of which is connected with the upper end of an arm 82 to form a toggle, the lower arm 82 being pivoted between its ends, at 83, on the main frame, and having at its lower end a projection 84 to enter a groove 85 formed in the periphery of a cam disk 86 on the shaft 22. This cam disk is so shaped that it will rock the arm 82 and hence the arm 78 and impart vertical movement to the upper movable die member. The lower movable die member is connected by means of a link 87 with an arm 88 which projects forwardly from the arm 82, adjacent to the axis thereof, and thus serves to actuate the lower movable die member simultaneously with the upper die member. The cam is so shaped that these movements of the two die members will take place immediately following the action of the bending plungers and while the die turret is locked against movement. In the operation of the machine the end portions of the bar will not lie snugly against the sides of the die plate and it is desirable to provide some means to guide these end portions accurately into engagement with the die surfaces and such means must of course be of such a character that it will not interfere with the operation of the forming devices. As here shown, each supporting bracket, 73 and 74, has slidably mounted therein, on that side opposite its movable die member, a guide finger 89 which is so connected with said movable die member that it will move therewith. As the upper movable die member is moved toward its coöperating fixed die surface the corresponding finger 89 will be carried past the upper fixed die surface and its beveled lower end will engage the bar and confine the same in the path of the upwardly moving lower die member. Likewise the guard 89 which is connected with the lower die member will project beyond the lower fixed die surface and will engage and confine the bar in the path of the downwardly moving die member. These guard fingers are yieldably mounted so that when engaged by the respective dies they will yield and move out of the path thereof. To this end coil springs 90 are confined between the ends of the fingers and fixed parts of the supporting structure. Each guard finger has a laterally extending portion 91 which is engaged by a shoulder on the coöperating movable die member and serves to retract the guard finger with the die member as the latter is moved into its inoperative position.

After the forming operation has been completed and the forming dies have been retracted to their inoperative positions the driving mechanism will again advance the die turret through a quarter revolution and the die plate upon which the article has just been formed will be moved away from the forming devices and another die plate moved into operative relation therewith. The rapidity of the motion is such that a formed article, or armature coil, will usually be thrown from the die plate by centrifugal force, but to prevent the possibility of an article sticking to the die plate and remaining thereon until it has again been brought into operative position I have provided a releasing device which will loosen the article on the die so that it will be drawn therefrom by centrifugal force, if centrifugal force alone is not enough for this purpose. To this end I have mounted on the top plate of the main frame a yieldable finger 191 which projects into the path of the die plates 46 and is adapted to pass through notches 92 formed in the lower edges thereof and extending above the lower die surface on the die plate which, it will be observed, is on the rear face of the die plate, and consequently the action of the finger 191 will lift the lower portion of the finished article from the die surface and will thus loosen the article as a whole. This yieldable arm may take various forms but, as here shown, it comprises an upper and lower portion pivotally connected one to the other and each having a forwardly projecting pin 93, which pins are connected one to the other by a spring 94. I also prefer to provide an inclined guard plate 95, through which the releasing device extends, so that any articles dropping thereon will be directed away from the turret and not toward the same.

The feeding devices may feed the wire, or bar, directly from the spool or coil but to avoid the possibility of the feeding disk slipping because of the drag on the wire due to the starting of a heavy spool into rotation, I prefer to provide an auxiliary feeding device which will unwind the wire from the spool and will maintain, between the same and the main feeding device, sufficient slack to take care of the feed by the main feeding devices. In the present drawings, I have shown such an auxiliary feeding device (see Figs. 1 and 2) as comprising a frame 192 supported by a standard 193 and rigidly secured to the bracket which supports the wire straightening devices 27. Mounted on this frame are a pair of feeding disks 194 and 195 which are preferably constantly operated at such a speed that a suitable amount of slack will be maintained between the same and the straightening devices. As here shown, the lower disk 194 is mounted on a shaft 96 which is journaled in the frame 192 and the upper disk 195 is journaled on an arm 97 which is pivotally mounted between its ends and this upper disk is held normally in engagement with the lower disk by means of a spring 98. The lever 97 has a handle 99 by means of which the disks may be separated manually. Either one or both of the feeding disks 194 and 195 may be positively driven but in the present instance I have positively driven both disks by providing the two shafts with intermeshing spur gears 100. The main shaft 96 may be driven directly from a suitable source of power, such as the main feeding device of the machine, but it is preferable that means be provided for varying the speed at which the feeding disks operate and I have therefore interposed between the shaft 96 and the source of power a variable transmission. As here shown, this transmission comprises a friction disk 101 mounted on a shaft 102 arranged at right angles to the shaft 96 and connected therewith by miter gears 103 and 104. Coöperating with the disk 101 is a second disk 105, the periphery of which frictionally engages the face of the disk 101 and transmits movement thereto, the disk 105 being movable radially of the disk 101 to vary the speed of rotation of the latter. As here shown, the disk 105 is mounted on a shaft 106 which is driven by means of a suitable sprocket chain 107 from a sprocket wheel 108 on the shaft of the main feeding device. The disk 105 is adjusted by means of a yoke 109 which engages a collar 110 secured to the disk 105, the disk and the collar being slidably mounted on the shaft 106 but being held against rotation relatively thereto. The yoke 109 is connected with a screw 111 which is threaded into a nut 112 rotatably mounted in a suitable bearing 113 and which is provided with a milled head 114 by means of which it may be rotated. By properly adjusting the variable transmission the auxiliary feeding device can be caused to maintain between the two feeding devices an amount of slack ample to take care of the intermittent feed of the feeding device.

The operation of the mechanism will be readily understood from the description of the several parts thereof. Briefly it is as follows: The wire is advanced intermittently, in sections of a predetermined length, by the main feeding device and as the wire is advanced one of the die plates 46 moves into a position with its bending die in operative relation to the wire and the supporting means therefor, that is the gripping device. Upon the completion of the feeding movement the movable gripping jaw is moved into engagement with the wire and at the same time the bending plungers 44 are advanced. The plungers operate in such relation to the gripping device that if the wire is not in engagement with the bending die the plungers will move it into engagement therewith before it is firmly gripped by the jaws. The continued movement of the plungers, after the wire has been gripped by the jaws, bends the end portions of the wire on the opposite sides of the die plate and upon the completion of this bending movement the plungers begin their return movement. Because of the shape of the cam surface 24, which cooperates with the operating lever 16 to actuate the gripping device, the upper jaw is held in gripping position until the lever 16 has almost completed its return movement, thus permitting the plungers to be withdrawn from the paths of the forming dies without releasing the wire from the gripping device. The forming dies are then operated to move the end portions of the bar into engagement with the fixed lateral die faces on the die plate and thus impart thereto the desired configuration. Immediately upon the withdrawal of the forming dies the die plate is withdrawn from its operative position and because of the speed at which the die plate is moved the finished article or coil will usually be discharged therefrom by centrifugal force. However, should the article stick in the die the releasing device 91 will engage the lower portion thereof and loosen the same in the die so that the next movement of the die plate will cause the article to be discharged therefrom. As the die plate is moved from its operative position a second die plate is moved into operative position and the cycle of operations above described is repeated. The mechanism is of such a character that the several operations can be accomplished at a high rate of speed and the finished articles can be manufactured very rapidly. The mechanism is simple and of such a character that it is not easily broken or rendered inoperative and the several parts thereof are readily accessible for adjustment.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a mechanism of the character described, bending devices, means to support a bar of metal in a position to be operated on by said bending devices, a plurality of bending dies arranged to be moved successively into a position adjacent to said bar supporting means and said bending devices, and means to intermittently actuate said bending dies and to cause said bending devices to operate during the intervals between the movements of said bending dies.

2. In a mechanism of the character described, bending devices, means to support a bar of metal in a position to be operated on by said bending devices, a plurality of bending dies arranged to be moved successively into a position adjacent to said bar supporting means and said bending devices, means to intermittently actuate said bending dies and to cause said bending devices to operate during the intervals between the movements of said bending dies, and means to lock said bending dies against movement during the operation of said bending devices.

3. In a mechanism of the character described, bending devices, means to support a bar of metal in a position to be operated on by said bending devices, a plurality of bending dies rotatable about a common axis and arranged to be moved successively into a position adjacent to said bar supporting means and said bending devices, and means to cause said bending dies to move intermittently about said common axis and to cause said bending devices to operate during the intervals between the movements of said bending dies.

4. In a mechanism of the character described, bending devices, means to support a bar of metal in a position to be operated on by said bending devices, a plurality of bending dies arranged to be moved successively into a position adjacent to said bar supporting means and said bending devices, forming devices to impart a predetermined configuration to the end portions of said bar of metal, and means to intermittently actuate said bending dies and to cause said bending devices and said forming devices to operate on the same bar of metal during the intervals between the movements of said bending dies.

5. In a mechanism of the character described, a gripping device to engage a bar of metal between the ends thereof, a plurality of bending dies arranged to be moved successively into a position adjacent to said gripping device, bending devices to act on said bar of metal while the latter is held by said gripping device to bend the same about that bending die which is in operative position, and means to intermittently actuate said bending dies and to cause said bending devices to operate between the movements of said bending dies.

6. In a mechanism of the character described, a gripping device to engage a bar of metal between the ends thereof, a plurality of bending dies arranged to be moved successively into a position adjacent to said gripping device, bending devices to act on said bar of metal while the latter is held by said gripping device and to bend the same about that bending die which is in operative position, forming devices to act on the end portions of said bar after they have been bent about said bending die, and means to intermittently actuate said bending dies, and to cause said bending devices and said forming devices to operate successively during the intervals between the movements of said bending dies.

7. In a mechanism of the character described, a gripping device to engage a bar of metal between the ends thereof, bending devices arranged on the opposite sides of said gripping device, forming dies supported normally above and below the plane of said gripping device and in front thereof, a plurality of bending dies movable successively into position between said forming dies and adjacent to said gripping device, and means for intermittently actuating said bending dies and for causing said bending devices and said forming devices to operate during the intervals between the movements of said bending dies.

8. In a mechanism of the character described, a support for a bar of metal, bending devices arranged on opposite sides of said support, forming devices mounted normally in fixed positions above and below the plane of said bar supporting means and in front thereof, a bending die movable into and out of a position between said forming devices and adjacent to said bar supporting means, means movable with said bending die to coöperate with said forming devices, and means to cause said bending devices and said forming devices to operate while said bending die is in said position.

9. In a mechanism of the character described, a gripping device to engage a bar of metal between the ends thereof, bending devices arranged to engage said bar of metal on opposite sides of said gripping device, forming devices mounted in fixed relation to said gripping device and arranged above and below the same, said forming devices comprising movable die members, a die plate movable into a position between said forming devices with its end portion adjacent to said gripping device and having on its lateral faces die surfaces to coöperate with said movable forming dies, and means to move said die plate into and out of said position and to cause said bending devices and said movable die members to operate while said die plate is in said position.

10. In a mechanism of the character described, a gripping device to engage a bar of metal between the ends thereof, bending devices to act on said bar of metal on opposite sides of said gripping device, forming devices mounted in fixed relation to said gripping device and arranged above and below the same, each forming device comprising a movable die member, a die turret carrying a plurality of die plates each comprising a bending die and having on its lateral faces die surfaces to coöperate with the respective forming die members, means for imparting intermittent rotation to said die turret to position said die plates successively between said forming devices and for causing said bending devices and said movable forming dies to operate while a die plate is in position between said forming devices.

11. In a mechanism of the character described, a device to grip a bar of metal between the ends thereof, said gripping device being held against bodily movement, a device to act on said bar of metal while it is held by said gripping device to bend the end portions thereof one toward the other, other means to act on said end portions of said bar while it is held by said gripping device to impart thereto a predetermined shape, and a die movable into and out of operative relation to said bending devices and the last mentioned means and having parts to coöperate with said last mentioned means.

12. In a mechanism of the character described, a device to grip a bar of metal between the ends thereof, said gripping device being held against bodily movement, devices to act on said bar of metal while it is held by said gripping device to bend the end portions thereof one toward the other, other means to act on said end portions of said bar while it is held by said gripping device to impart thereto predetermined shape, and a plurality of dies movable successively into and out of operative relation to said bending devices and the last mentioned means and having parts to coöperate with said last mentioned means.

13. In a mechanism of the character described, a device to grip a bar of metal between the ends thereof, devices to act on said bar of metal while it is held by said gripping device to bend the end portions thereof one toward the other, a plurality of dies movable successively into and out of operative relation to said bending devices, forming devices mounted adjacent to said gripping device, and parts movable with said dies to coöperate with said forming devices.

14. In a mechanism of the character described, means to support a bar of metal, bending devices arranged on opposite sides of said supporting device, a plurality of bending dies mounted for rotation about a common axis and arranged to be moved successively into operative relation to said bending devices, a shaft connected with said bending dies to rotate the same, a disk connected with said shaft and having a plurality of radial slots corresponding to the number of said bending dies and having those portions of its periphery lying between said slots provided with recesses, a second disk mounted on an axis parallel to the axis of the first mentioned disk and having its periphery arranged to enter the recesses in the periphery of the first mentioned disk, a pin connected with said second disk and adapted to enter the slots in the first mentioned disk and impart rotation thereto, a portion of the periphery of the last mentioned disk being cut away to permit the first mentioned disk to rotate when engaged by said pin, and means for actuating the last mentioned disk.

15. In a mechanism of the character described, a die turret comprising a plurality of dies rotatable about a common axis, a shaft connected with said turret, a disk connected with said shaft and having a plurality of radial slots corresponding in number to the number of dies of said turret, said disk having those portions of its periphery lying between said slots recessed, a second disk having a flange adapted to enter the recesses in the periphery of the first mentioned disk, an arm projecting from said second disk, a pin carried by said arm and adapted to enter the slots in said first mentioned disk and impart rotation to the latter, that portion of the flange of the second disk adjacent to said arm being cut away, and means for actuating said second disk.

16. In a mechanism of the character described, the combination with bending devices and stationary means to support a bar of metal in a position to be operated on by said bending devices, of a die turret comprising a plurality of dies movable about a common axis into an operative position with relation to said supporting means and said bending devices, means to impart intermittent movement to said die turret, a locking device to hold said turret against movement when any one of said dies is in said operative position, and means to release said turret to permit the further rotation thereof.

17. In a mechanism of the character described, the combination with bending devices and stationary means to support a bar of metal in a position to be operated on by said bending devices, of a die turret comprising a plurality of dies movable about a common axis into an operative position with relation to said supporting means and said bending devices, means for imparting intermittent movement to said die turret, a locking device connected with said turret and having a plurality of recesses in the periphery thereof, a movable bar having a part adapted to enter one of the recesses of said disk to lock the latter against rotation, means for holding said bar normally in engagement with said disk, and cam operated means for releasing said bar to release the disk and the turret.

18. In a mechanism of the character described, the combination with bending devices and stationary means to support a bar of metal in a position to be operated on by said bending devices, of a die turret comprising a plurality of dies movable about a common axis into an operative position with relation to said supporting means and said bending devices, means for imparting intermittent movement to said die turret, a locking disk connected with said turret and having a plurality of recesses in the periphery thereof, a bar slidably mounted for movement into and out of engagement with one of said recesses, a spring to hold said bar normally in engagement with said disk, a lever to retract said disk against the tension of said spring, and a cam to operate said lever.

19. In a mechanism of the character described, combination with bending devices and stationary means to support a bar of metal in a position to be operated on by said bending devices, of a die turret comprising a plurality of dies movable about a common axis into an operative position with relation to said supporting means and said bending devices, means for imparting intermittent movement to said die turret, a locking disk connected with said turret and having a plurality of recesses in the periphery thereof, a bar mounted for sliding movement into and out of one of the recesses of said disk, a spring to hold said bar normally in engagement with said disk, a lever pivoted between its ends and having one end connected with said bar, and a cam acting on said lever to retract said bar and release said disk.

20. In a mechanism of the character described, a stationary device to grip a bar of metal between the ends thereof, a bending device arranged to act on said bar of metal on opposite sides of said gripping device, forming devices to act on the respective end portions of said bar while it is held by said gripping device, a plurality of die plates mounted for rotation about a common axis and moving successively into an operative position between said forming devices, means for intermittently moving said die plates about said axis, a locking device to retain said dies in said operative position during the intervals between the movements thereof, and means for actuating said bending devices and said forming devices while said die plates are locked against movement.

21. In a mechanism of the character described, a gripping device comprising a fixed jaw, a movable jaw pivotally mounted on a relatively short radius, an operating arm pivotally mounted on an independent axis and having a longer radius than said movable jaw and operatively connected with said movable jaw, means for actuating said operating arm, a bending die movable into and out of a position adjacent to said gripping device, and bending devices arranged to act on said bar of metal on opposite sides of said gripping device to bend the same about said bending die.

22. In a mechansim of the character described, a gripping device comprising a fixed jaw, a movable jaw pivotally mounted on a relatively short radius, an operating arm pivotally mounted on a longer radius and operatively connected with said movable jaw, said operating arm having a part extending beyond its axis and provided with a cam face, an operating lever having a part to engage said cam face and actuate said movable jaw, a bending die movable into and out of a position adjacent to said gripping device, and bending devices to coöperate with said bending die.

23. In a mechanism of the character described, a gripping device comprising a fixed lower jaw, an upper jaw pivotally mounted on said lower jaw on a relatively short radius, an operating arm pivotally mounted adjacent to said upper jaw on a relatively long radius and having its forward end loosely connected with the forward end of said upper jaw, means for actuating said operating arm, a bending die movable into and out of operative position adjacent to said gripping device, and bending devices to coöperate with said bending die.

24. In a mechanism of the character described, a gripping device for a bar of metal comprising a fixed jaw, a movable jaw pivotally mounted adjacent to said fixed jaw, an operating arm pivotally mounted on an independent axis adjacent to said movable jaw and operatively connected therewith to move the same toward and from said fixed jaw, an actuating device acting on said operating arm to impart movement thereto, a die movable into a position adjacent to said gripping device, and bending devices to act on a bar of metal while it is held by said gripping device to bend the same about said die.

25. In a mechanism of the character described, a gripping device comprising a fixed jaw, a movable jaw pivotally mounted adjacent to said fixed jaw, an operating arm pivotally mounted on an independent axis adjacent to said movable jaw and operatively connected therewith to move the same toward and from said fixed jaw, and means for actuating said operating arm, said operating arm having a portion extending beyond its axis, a cam plate adjustably mounted on said portion of said operating arm, and a lever having a part arranged to engage said cam plate to actuate said movable jaw.

26. In a mechanism of the character described, a supporting frame, a device mounted on said frame to support a bar of metal, guide plates mounted on said frame above and below said support and projecting in front thereof, said guide plates having their adjacent edges spaced apart, forming dies slidably mounted on said guide plates and arranged out of alinement one with the other, a die plate movable laterally between said guide plates and having on its opposite sides die surfaces to coöperate with the respective forming dies, bending devices to bend the end portions of said bar of metal along the opposite sides of said die plate, and means to actuate said movable die members.

27. In a mechanism of the character described, a supporting frame, a device mounted on said frame to support a bar of metal, guide plates mounted on said frame above and below said support and projecting in front thereof, said guide plates having their adjacent edges spaced apart, forming dies slidably mounted on said guide plates and arranged out of alinement one with the other, a die plate movable laterally between said guide plates and having on its opposite sides die faces to coöperate with the respective forming dies, bending devices to bend the end portions of said bar of metal along the opposite sides of said die plate, means to actuate said movable forming dies, guards carried by the respective guide plates and operatively connected with the forming dies for movement across the faces of said die plate to retain the adjacent portions of said bar in positions to be engaged by said forming dies, said guards being yieldably mounted to permit them to be retracted by engagement with the opposed forming dies.

28. In a mechanism of the character described, a supporting frame, a device mounted on said frame to support a bar of metal, guide plates mounted on said frame above and below said support and projecting in front thereof, said guide plates having their adjacent edges spaced apart, forming dies slidably mounted on said guide plates and arranged out of alinement one with the other, a die plate movable laterally between said guide plates and having on its opposite sides die surfaces to coöperate with the respective forming dies, bending devices to bend the end portions of said bar of metal along the opposite sides of said die plate, means to actuate said movable forming dies, a guard finger carried by each guide plate on that side thereof opposite the movable die member, said guard finger being connected with the die member for movement therewith across the face of the die plate and into the path of the die member on the other guide plate, and said guide finger being yieldably mounted to permit it to be retracted by engagement with said other die member.

29. In a mechanism of the character described, means for supporting a bar of metal, a die plate movable laterally into and out of an operative position with relation to said supporting means, bending devices to bend the end portions of said bar of metal along the sides of said die plate, forming devices arranged above and below said die plate, said die plate having die surfaces to coöperate with said forming devices and having a recess in one edge thereof, extending across the die surface on the rear face thereof and a trip finger mounted in the path of the recessed portion of said die plate to engage the formed bar on said die and disengage the same therefrom.

30. In a mechanism of the character described, a wire gripping device, bending devices arranged to engage the bar on opposite sides of the gripping device, forming dies movably mounted above and below the plane of said gripping device, a plurality of die plates rotatable about a common axis into and out of operative relation with said forming devices, each of said die plates having die surfaces to coöperate with the respective movable die members and each die plate having a notch in the lower edge thereof, extending across the die surface on the rear face thereof and a yieldable finger mounted in line with the notches in said die plates and adapted to engage the formed bar and disengage the same from said die surface.

31. In a mechanism of the character described, a gripping device comprising a movable jaw, an actuating arm operatively connected with said movable jaw, and having a cam surface, bending devices arranged on opposite sides of said gripping device, an operating lever connected with said bending devices and having a part adapted to engage the cam surface of the operating arm for said movable jaw, and means for actuating said lever.

In testimony whereof, I affix my signature hereto.

FREDERICK C. NICKOL.